April 7, 1953 H. F. SMITH 2,633,678
MACHINE TOOL AND METHOD OF OPERATING
Filed May 17, 1951 6 Sheets-Sheet 1
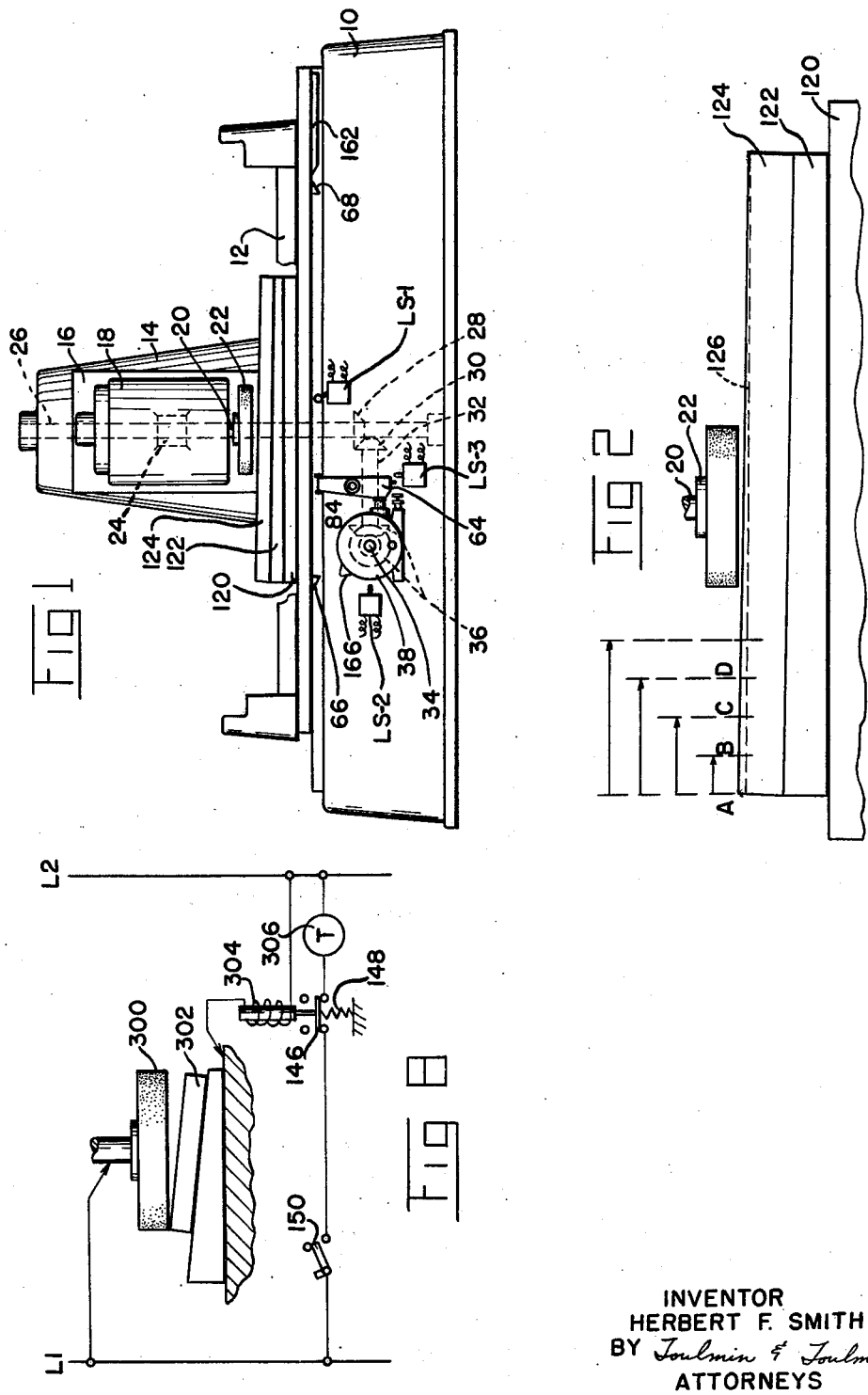
INVENTOR
HERBERT F. SMITH
BY Toulmin & Toulmin
ATTORNEYS

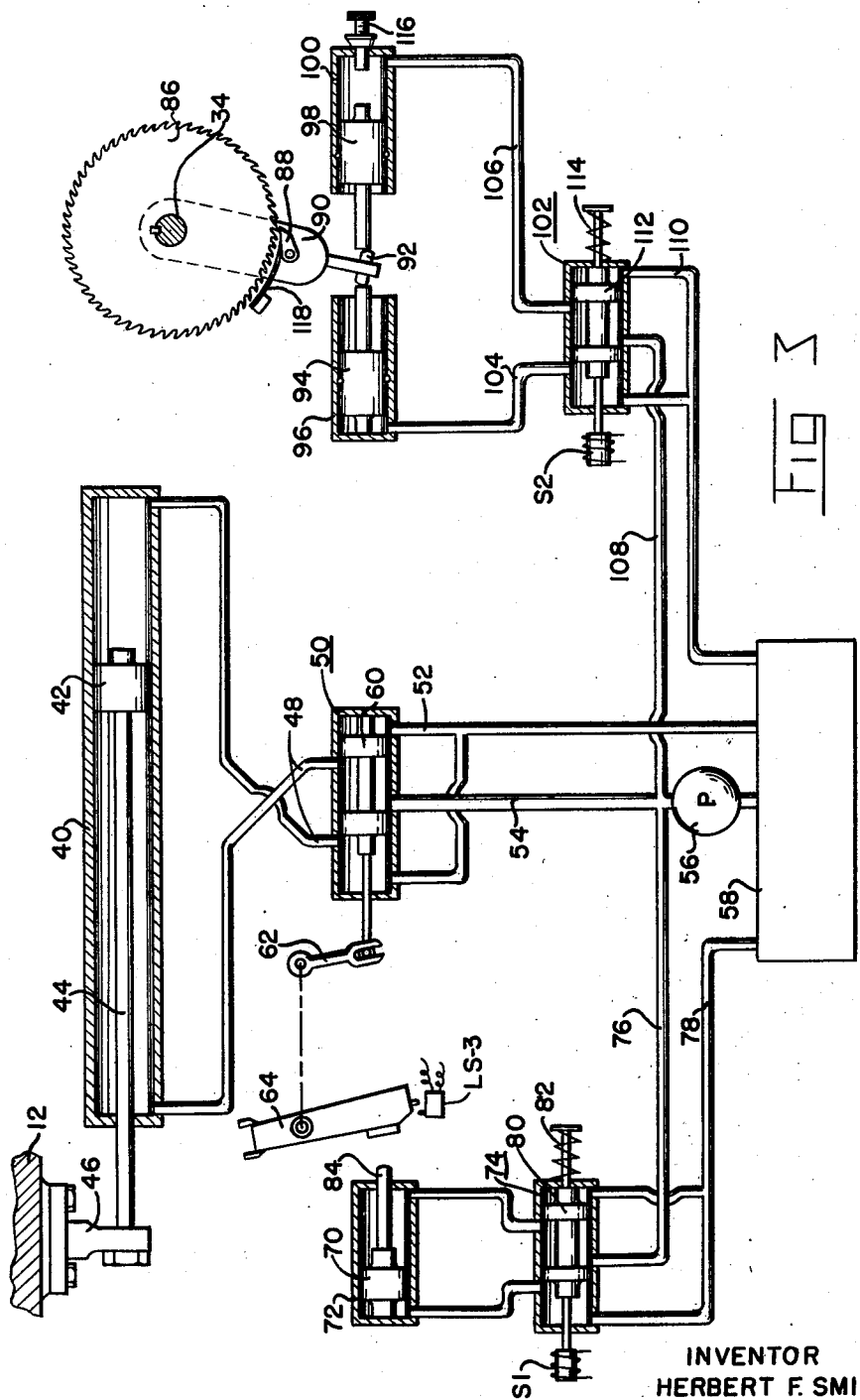

April 7, 1953 H. F. SMITH 2,633,678
MACHINE TOOL AND METHOD OF OPERATING
Filed May 17, 1951 6 Sheets-Sheet 4
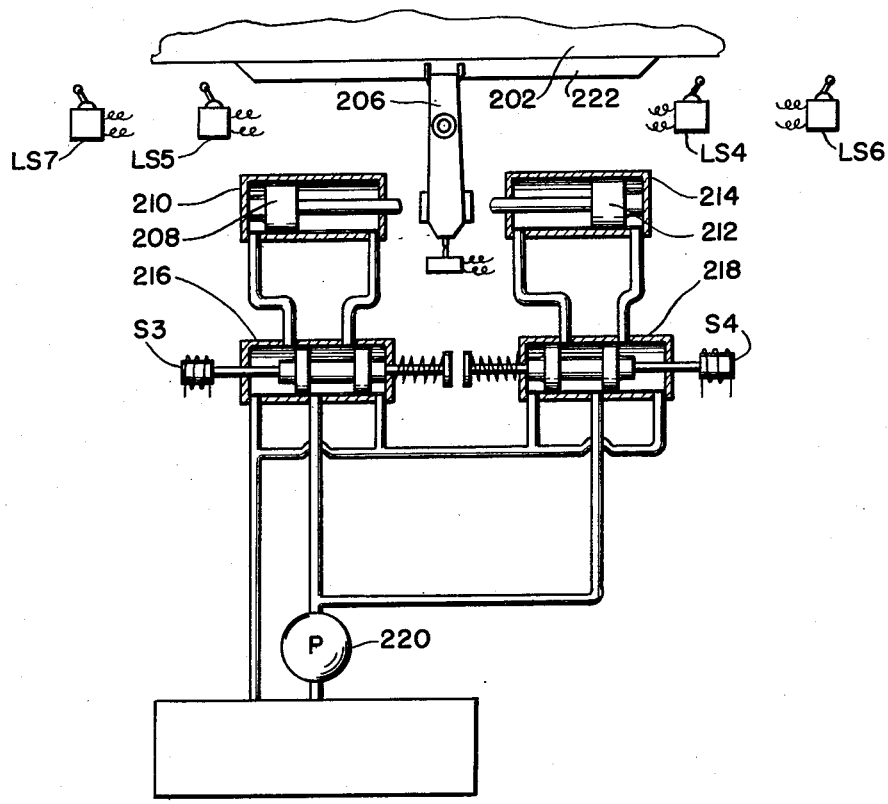
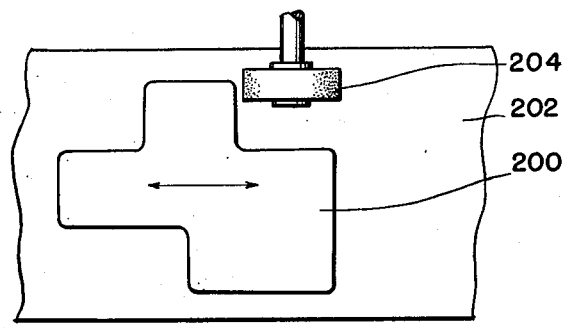
INVENTOR
HERBERT F. SMITH
BY Toulmin & Toulmin
ATTORNEYS April 7, 1953 H. F. SMITH 2,633,678
MACHINE TOOL AND METHOD OF OPERATING
Filed May 17, 1951 6 Sheets-Sheet 6

INVENTOR
HERBERT F. SMITH
BY Toulmin & Toulmin
ATTORNEYS

Patented Apr. 7, 1953

2,633,678

UNITED STATES PATENT OFFICE 2,633,678

MACHINE TOOL AND METHOD OF OPERATING

Herbert F. Smith, Springfield, Ohio, assignor to The Thompson Grinder Company, Springfield, Ohio, a corporation of Ohio Application May 17, 1951, Serial No. 226,916

19 Claims. (Cl. 51—122)

This invention relates to machine tools and the like, and particularly to machine tools having relatively reciprocable work supporting means and cutting means.

A certain class of machine tools, such as planers, shapers, grinders, and the like, operate by having the cutting tool of the machine and the work being cut reciprocate relatively. Ordinarily, it is possible to carry out this relative reciprocation between fixed limits until the work to be done is completely finished. In other cases, either the workpiece being shaped or the cut being taken on the workpiece will be irregular, and if the relative reciprocation of the cutting tool on the workpiece is carried out between fixed limits, considerable waste travel, and, accordingly, considerable waste time is involved in carrying out a complete work cycle. In some instances this lost time can amount to a substantial loss and may even amount to a substantial portion of the entire work cycle.

Having the foregoing in mind, the particular object of this invention is to provide an arrangement for machine tools of the nature referred to in which the lost time due to excessive overtravel of the relatively reciprocable parts is eliminated.

A still further object is the provision of a machine tool having relatively reciprocable tool supporting and workpiece supporting elements in which the reciprocation of the elements is variable, so that there is a minimum of overtravel of the said elements during a work cycle of the machine.

A still further object is the provision of a method of operating a machine tool to provide for a variable cutting stroke thereof to reduce to a minimum idle movements of the parts of the machine tool during a work cycle.

A particular object of this invention is the provision in a grinding machine having a relatively reciprocable wheel head and workpiece supporting table of means for varying the relative reciprocation of the wheel head and table, so that there is a minimum of overtravel of the grinding wheel and workpiece at each end of the cutting stroke of the wheel.

These and other objects and advantages will become more apparent upon reference to the following description taken in connection with the accompanying drawings, in which:

Figure 1 is a front elevational view of a grinding machine constructed according to my invention and adapted for operation in accordance with the method of my invention;

Figure 2 is a diagrammatic view showing one type of workpiece adapted for being operated in accordance with this invention and showing the manner in which the cutting member takes variable cuts on the workpiece;

Figure 3 is a more or less diagrammatic and simplified showing of the principal elements of the hydraulic operating circuit of the machine tool of Figure 1, and embodying the novel elements of this invention;

Figure 5 is a plan view showing a type of workpiece different from that illustrated in Figure 2, and also adapted for being machined in accordance with the teachings of this invention;

Figure 6 is a fragmentary view showing a modified control arrangement for regulating the stroke of the table of the machine tool;

Figure 8 is a diagrammatic view showing a modified arrangement for detecting the end of the cutting stroke of the cutting member and for instituting the reversal of the relative movement between the cutting member and the workpiece supporting member.

General arrangement

Figure 4:
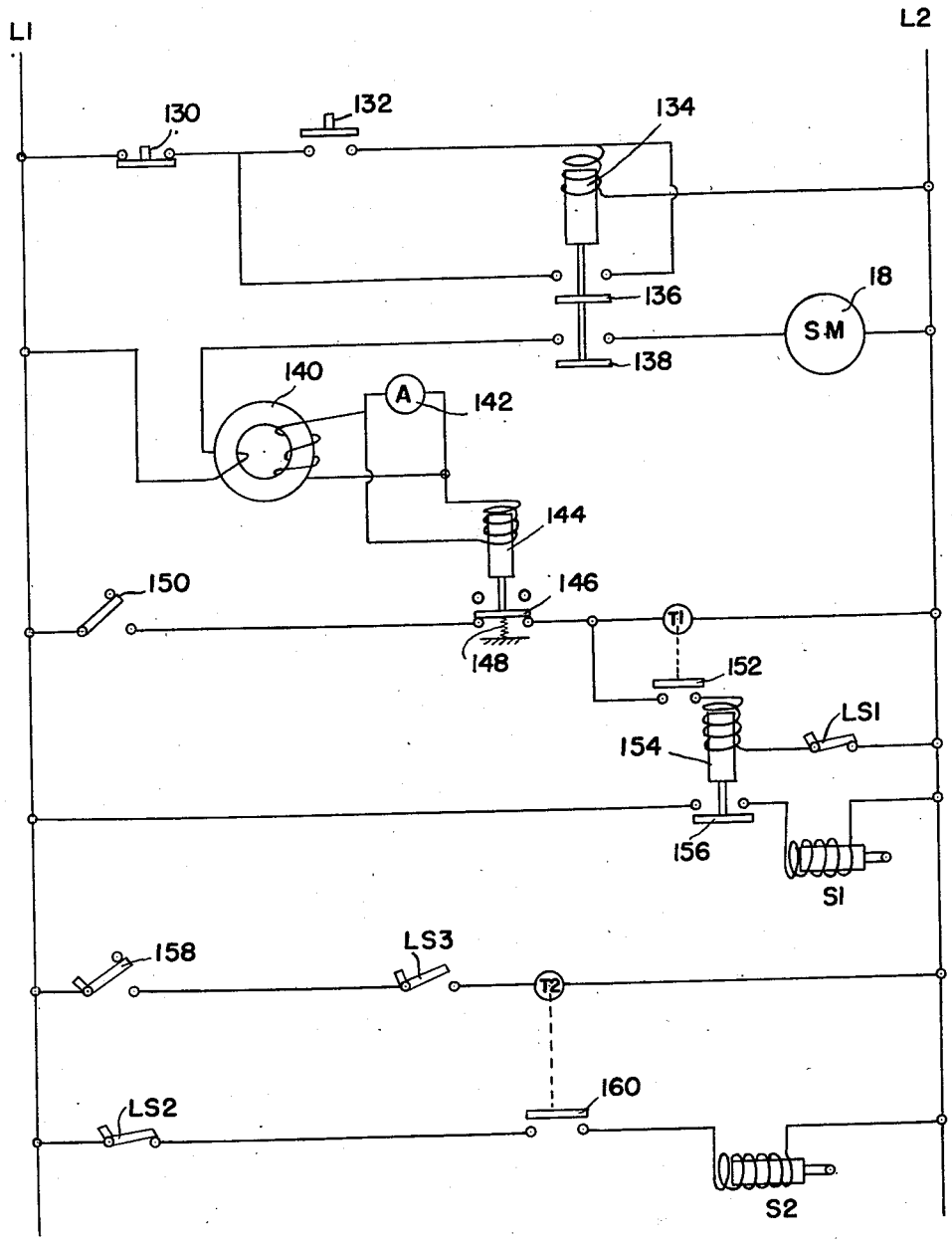
Figure 4 is a diagrammatic and simplified wiring diagram showing the principal parts of the electric operating circuit which controls the hydraulic system of Figure 3, and which forms a part of this invention.

According to this invention, there is provided in a machine tool having a workpiece supporting table and a cutting member, and also having means for relatively reciprocating the table and member for carrying out a cutting stroke, means for detecting the end of the cutting stroke and for bringing about substantially immediate reversal of the said relative movement, thereby to prevent the wasting of time during a work cycle by overtravel of the cutting member and workpiece.

In the drawings in this application there is illustrated a grinding machine, but it will be understood that this invention is useful not only with grinding machines, but with planers, shapers, and substantially all other machine tools which operate on the principle of relatively reciprocating or relatively oscillating a workpiece and a cutting member.

According to one modification of my invention, and which modification is particularly adapted for use with a grinding machine of the nature illustrated, there is an ammeter connected in the electric circuit to the drive motor of the grinding wheel. Connected in parallel with this ammeter is a contactor which is normally in one position when the wheel is in engagement with the work and thus loaded, and in another position when the wheel is disengaged from the work and thus running light. The change in energization of the contactor is utilized to actuate mechanism for reversing the relative reciprocation of the grinding wheel and table.

This modification, as well as the other modifications, may be arranged so that the reversal of the relative reciprocation of the grinding wheel and table is controlled by the said contactor at one limit, while at the other limit a fixed arrangement is employed. This type of control is particularly adapted for the grinding of tapered members, such as aircraft wing spars, tapered gibs, and the like.

According to another modification of this invention, the work stroke may be variable as to both its limits, and this modification is particularly adapted for the machining of workpieces which are irregular in outline.

Still another modification of this invention depends on the electric contact of the cutting member and the workpiece, so that when the cutting member leaves the workpiece, as at the end of a cutting stroke, the relative reciprocation between the cutting member and the workpiece will be reversed.

A still further modification employs a strain gauge of a well-known type positioned on the machine tool at such a point that the change in its qualities between a loaded condition of the tool when making a cut and an unloaded condition of the machine tool when the cutting member runs off the workpiece can be utilized to institute the reversal of the relative movement between the cutting member and workpiece.

In another modification, a light beam and photocell is employed, and these are so arranged that when the cutting member is in engagement with the workpiece, the light beam to the photocell is interrupted, and when the cutting member runs off the workpiece, the light beam is established, and this change in stimulus supplied to the photocell is utilized for actuating the reversing mechanism.

*Structural arrangement*

Referring to the drawings somewhat more in detail, the machine tool illustrated in Figure 1 is a surface grinder of a well-known type comprising a bed 10 having reciprocably mounted thereon a workpiece supporting table 12. The machine comprises a column 14, and vertically reciprocable thereon is a wheel head 16 comprising an electric spindle motor or drive motor 18 that drives the spindle of shaft 20, on which is mounted the grinding wheel 22.

Wheel head 16 preferably comprises the usual arrangement for causing it to rise and lower on the column 14, and which may consist of the nut 24 mounted on the back of the wheel head which engages the screw 26 mounted in the column for rotation. Screw 26 may have a bevel gear 28 thereon meshing with a bevel gear 30 on a shaft 32 that is connected with another shaft 34 through another set of bevel gears 36.

Shaft 34 extends out through the front wall of bed 10 and has mounted thereon a hand wheel 38. It will be evident that rotation of hand wheel 38 will cause raising or lowering of the wheel head 16, depending on the direction of rotation of the said hand wheel.

Turning for the moment to Figure 3, it will be seen that table 12 is adapted for being reciprocated on base 10 by means of a motor comprising a cylinder 40 having therein a piston 42 connected by rod 44 with a bracket 46 dependent from the said table. The opposite ends of cylinder 40 are connected by the service conduits 48 with the service ports of a 4-way reversing valve 50 that also comprises exhaust ports connected with exhaust conduit 52 and a pressure port connected with a pressure conduit 54 leading to the discharge side of pump 56 connected to draw hydraulic fluid from a reservoir 58.

Valve 50 comprises the reciprocable valve member 60 movable for reversibly connecting service conduits 58 with the pressure and exhaust ports of valve 50. Valve member 60 is adapted for actuation between its two operative end positions by lever 62, which is connected with a lever 64 mounted externally of bed 10. As will best be seen in Figure 1, lever 64 is adapted for being moved in opposite directions for oscillating lever 62, and thereby reciprocating valve member 60 by the dogs 66 and 68 adjustably mounted on table 12 in any conventional manner.

Associated with lever 64 for moving it in one direction independently of the position of dog 68 is a double-acting plunger 70 mounted in a cylinder 72, and which has its opposite ends connected with the service ports of a 4-way valve 74 that also comprises a pressure port connected by conduit 76 with the discharge side of pump 56 and exhaust ports connected by conduit 78 with reservoir 58.

Valve 74 comprises a reciprocable valve member 80 normally urged by a spring 82 into position to connect the pressure port of valve 74 with the right end of cylinder 72, as viewed in Figure 3, thereby to retract plunger 70 into the cylinder 72 to withdraw the projecting rod part 84 thereof from operative engagement with lever 64.

A solenoid SI is provided in association with valve member 80, and, when energized, is operable to shift the valve member 80 to its other operative position, thereby to supply pressure fluid to the left end of cylinder 72 to drive the plunger 70 rightwardly, whereby rod part 84 will bring about shifting of lever 64 in a counterclockwise direction.

Associated with the downfeed mechanism is a ratchet wheel 86 mounted on shaft 84. This ratchet wheel is adapted for being driven in a direction that will cause downward movement of the wheel head 16 by means of a pawl 88 mounted on an arm 90 oscillatably carried by shaft 34. The lower end of arm 90 includes a pin 92, one end of which engages a single-acting plunger 94 in cylinder 96, and the other end of which engages the oppositely arranged single-acting plunger 98 arranged in cylinder 100.

A 4-way reversing valve 102 is provided, and which has one service port connected by conduit 104 with cylinder 96, and another service port connected by conduit 106 with cylinder 100. Valve 102 also comprises a pressure port connected by conduit 108 with the discharge side of pump 56 and exhaust ports connected by a conduit 110 with reservoir 58.

Valve 102 comprises a valve member 112 normally urged by spring 114 into position to connect the pressure port thereof with conduit 106, whereby the plungers 98 and 94 occupy their Figure 3 positions. The valve member also has associated therewith a solenoid S2, which, when energized, will move the valve member into position to connect the said pressure port with conduit 104, thereby to move plungers 94 and 98 rightwardly. An adjustable stop screw 116 may be provided for limiting the rightward travel of the plungers, if desired, to regulate the amount of movement imparted to ratchet wheel 86 when the said plungers are moved rightwardly by energization of solenoid S2.

In order to release ratchet wheel 86 from the influence of pawl 88 when the plungers are in their Figure 3 position, to permit actuation of shaft 34 in either direction by hand wheel 38, there is preferably provided the masking or release strip 118 mounted so as to engage the pawl and release it from contact with the ratchet wheel when arm 90 is in its retracted position, as shown in Figure 3.

The particular workpiece illustrated in Figure 1 is a bar which is to be formed from its original rectangular shape to a tapered shape. As will be seen in Figures 1 and 2, the set-up for accomplishing this includes a magnetic chuck 120 mounted on table 12 and positioned thereon a tapered flux bar 122 formed to the same taper that it is desired to grind on the workpiece.

Mounted on the tapered flux bar is the workpiece 124, and as will be seen in Figures 1 and 2, this is a straight rectangular bar of uniform cross-section when it is initially placed in position in the machine.

Due to the presence of the tapered flux bar 122, the upper surface of the workpiece, before any cutting takes place thereon, is inclined at an angle to the direction of travel of the table 12, and, when the grinding is completed, the upper surface of the workpiece will be parallel to the direction of travel of the table, as indicated by the dotted finish line 126 in Figure 2.

Because of this arrangement the first cut on the workpiece with a normal feed of the wheel will take place between the points A and B on Figure 2. With normal downfeed, the second cut on the workpiece will take place between A and C, the third cut, between A and D, and so on until the cut on the workpiece extends from end to end thereof.

At this point it will be evident that if a fixed stroke is given the table sufficient to permit the maximum length of cut on the workpiece to be taken, then substantially half of the operating time in machining the workpiece will be waste time, with no useful work being done.

According to this invention, successive reciprocations of the work table during a grinding operation are made progressively greater, so that the actual travel of the table is only that necessary to accomplish the cut to be made.

This is done by controlling the operation of the machine through the hydraulic circuit of Figure 3 by the electric control system illustrated in Figure 4.

The electric circuit in Figure 4 consists of the power lines L1 and L2, and connected therebetween in series with a normally closed stop switch 130 and normally open start switch 132 is the solenoid of a contactor 134, having normally open blades 136 and 138. Blade 136 provides a holding circuit for the contactor after it is energized by closing start switch 132, and blade 138 completes a circuit through the spindle motor 18. The line to the spindle motor 18 includes a current transformer 140 whose output terminals are connected to the opposite posts of an ammeter 142.

These output terminals are also connected across the solenoid of a contactor 144 comprising a blade 146. Contactor 144 is normally urged by a spring 148 to close blade 146 on its contacts. It will be apparent at this point that when motor 18 is loaded, it is, accordingly, drawing a relatively heavy current, contactor 144 will be in an energized state, and blade 146 will be separated from its contacts. The arrangement is such, however, that when the motor 18 is running light, as when the grinding wheel is disengaged from the work member, the energization of the solenoid of contactor 144 is reduced to the point that spring 148 becomes effective for closing blade 146 on its contacts.

The said contacts of blade 146 are arranged in series with a selector switch 150 and a timer T1. Timer T1 controls a blade 152 arranged in circuit with the solenoid of a contactor 154. A limit switch LS1 is also arranged in circuit with the solenoid of contactor 154, so that opening of either the selector switch 150 or the limit switch LS1 will prevent energization of contactor 154.

Contactor 154 controls a blade 156 that is normally open and which is in series with the solenoid S1, previously referred to in connection with valve 74, associated with plunger 70 and cylinder 72 that operate to move lever 64 independently of table dog 68.

Also connected between lines L1 and L2 is another timer T2 in series with a selector switch 158 and a normally open limit switch LS3. Timer T2 controls a blade 160 arranged in series with a normally closed limit switch LS2 and the solenoid S2 of the valve 102 associated with the downfeed mechanism described in connection with Figure 3.

The limit switch LS1, referred to above, is mounted on the bed 10, and is adapted for being engaged and opened by a table mounted cam 162. This cam is so positioned that when the cutting of the workpiece has progressed to the point that the grinding wheel is making a cut on the workpiece extending substantially completely thereacross, the said cam will engage and open switch LS1, thereby rendering ineffective the automatic current sensitive reversing mechanism.

Switch LS3 is also mounted on bed 10, and is adapted for being actuated by element 164 on lever 64 as the said lever passes through its neutral position during its movement from one side to the other at the moment of reversal of table 12.

Switch LS2 is also mounted on bed 10, and is adapted for being engaged and opened by a member 166 adjustably mounted on hand wheel 38.

Cam 166 is adjusted to give the desired amount of downfeed, and then, when the said cam engages and opens switch LS2, no further downfeed of the wheel head is possible.

*Operation*

In the operation of the embodiment illustrated in Figures 1 through 4, a workpiece is placed in the machine in working position, as illustrated in Figures 1 and 2. The downfeed stop 166 is then adjusted on hand wheel 38 to give the proper amount of feed to bring the grinding wheel and the work to the depth indicated by the finish line 126 in Figure 2.

The machine is then started by energizing the spindle motor 18 to drive the wheel at grinding speed and commencing operation of pump 56 by energizing its drive motor. The table then commences to reciprocate, and the wheel engages the workpiece at its left end and makes a cut between the points A and B.

Assuming the table to move rightwardly on its initial stroke, table dog 66 will move table reverse lever 64 when the wheel runs off the left end of the workpiece and cause reversal of the table movement through shifting of valve member 60 of valve 50.

When lever 64 is shifted through its center position, it engages and actuates limit switch LS3 which brings about operation of the downfeed mechanism to advance the wheel head downwardly a predetermined amount. The table now moves leftwardly, and the grinding wheel makes a new cut across the workpiece.

As soon as the grinding wheel runs off the workpiece to the right, the current to the spindle motor drops, and this drop in current is conveyed through current transformer 40 to the solenoid of contactor 144 and permits the contactor to close on its contacts, thereby energizing timer T1, which closes its blade 152 to energize the solenoid of contactor 154.

Closing of contactor 154 energizes solenoid S1 of valve 74 so that plunger 70 is driven rightwardly and shifts table reversing lever 64 in a counterclockwise direction. This again reverses the table movement and also brings about another downfeed of the wheel head.

The foregoing cycle of operations continues with the work stroke of the table gradually increasing in length, until the wheel is making substantially a complete pass across the workpiece, and at which time cam 162 will engage and open limit switch LS1 and render ineffective the automatic table reverse mechanism. When this occurs, table dog 68 becomes effective for shifting table reverse lever 64 so that the grinding of the workpiece is completed by the reciprocation of the table between fixed limits in the ordinary manner of surface grinding.

Reciprocation of the table and downfeed of the wheel head will continue until cam 166 engages and opens switch LS2, at which time no further downfeed of the wheel head will occur, and the grinding operation can be completed either by halting the table and retracting the wheel head from the work immediately, or else doing this after a predetermined spark-out period.

It will be apparent that by carrying out the work cycle in the described manner, there is substantially no lost time consumed in overtravel of the cutting member and workpiece, and that, accordingly, at any given time more workpieces can be produced, and this provides for more economical production, less wear on the machine, and more effective application of the skilled machine operator's time.

Figure 7:
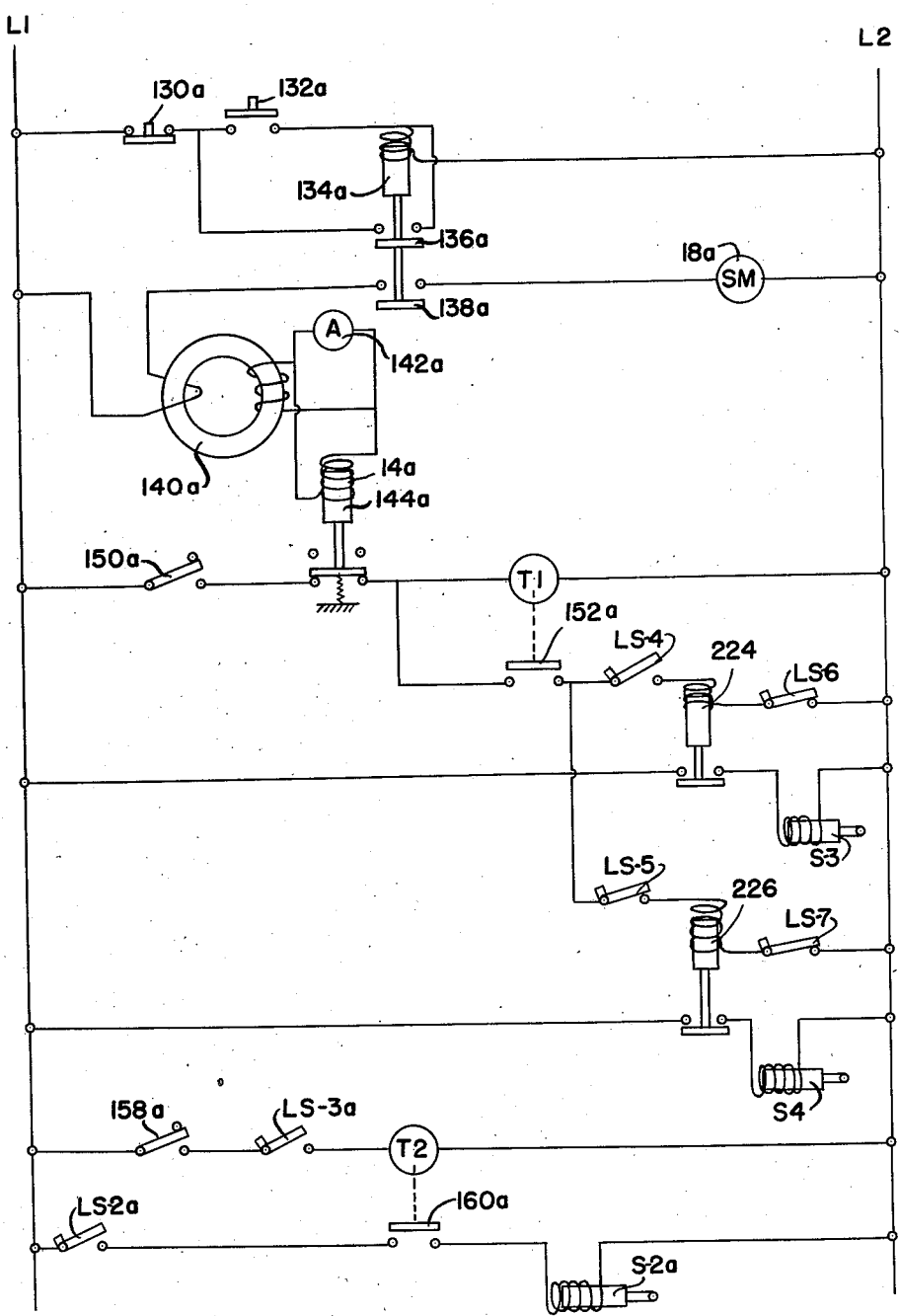
Figure 7 is a diagrammatic view of the electric circuit adapted for use with the modification of Figure 6.

Modifications of Figures 5, 6, and 7

In Figure 5 there is illustrated a somewhat different type of workpiece adapted for being operated in accordance with this invention. In Figure 5 the workpiece 200 has an irregular outline and is not necessarily being ground to a taper. The part 200 is mounted on a table 202 for being cut by cutting member 204, which may comprise a grinding wheel as illustrated.

In the case of the workpiece 200, it will be evident that the application of the teachings of this invention requires that both of the limits of table travel be variable. This is accomplished by the arrangement illustrated in Figure 6. In Figure 6 the table reverse lever is indicated at 206, and arranged on one side thereof is the reversing plunger 208 in cylinder 210, and on the other side is the reversing plunger 212 in cylinder 214.

Cylinder 210 has its opposite ends connected with reversing valve 216 having an operating solenoid S3, while cylinder 214 has its opposite ends connected with the reversing valve 218 having an operating solenoid S4. Pressure fluid may be supplied to the reversing valves by a pump 220. It will be evident that the arrangement described up to this point is the same as that described in connection with the first modification, except for the addition of plunger 212 on the right side of the reversing lever 206.

For controlling the actuation of plungers 208 and 212 so that at one end of the cutting stroke of the machine one will be effective, and at the other end the other will be effective, there is provided the cam 222 mounted on the table 202, and which cooperates with limit switches LS4 and LS5, forming a part of the electric control circuit of Figure 7.

In Figure 7 the spindle motor is connected between the lines L1 and L2 in the same manner as illustrated in Figure 4, and the same reference numerals are employed, with the addition of a subscript $a$.

The same current transformer arrangement and automatic reverse contactor and selector switch are also employed, and the numerals for these elements are also the same as those employed in Figure 4 with the addition of a subscript $a$.

The downfeed arrangement is likewise the same as in Figure 4, and corresponding reference numerals, with the addition of a subscript $a$, are also applied to these elements.

The essential differences between Figures 4 and 7 are that in Figure 7 the contactor 224 pertaining to solenoid S3 of valve 216 is arranged in series with limit switch LS4, so that when the table is toward the right end of its stroke, the automatic reverse mechanism positioned to the left side of table reverse lever 206 is ineffective.

Similarly, contactor 226 pertaining to solenoid S4 of valve 218 is arranged in series with limit switch LS5, so that when the table is on the other side of its center position, the automatic reverse mechanism on the right side of table reverse lever 206 is ineffective.

If desired, the automatic table reverse mechanisms can be made ineffective whenever the table reaches a predetermined point in either direction of reciprocation by including in circuit with contactor 224 normally closed switch LS6, and in circuit with contactor 226 normally closed switch LS7, these switches being arranged as indicated in Figure 6 for engagement by cam 222, or similar cam means carried by table 202.

It will be apparent that the limit switches LS4 and LS5 represent only one manner in which the automatic reversing mechanisms can be made selectively operable, and that other means, such as a double-throw toggle switch, could be provided, which could be actuated by the table reverse lever 206, thereby to make one or the other of the automatic reversing devices effective.

Certain types of workpieces may include a cavity between the end limits or in other manners present a discontinuous surface, and it will be apparent that under such circumstances the reversal of table movement could take place sooner than desired. It will also be apparent, however, that situations of this nature could readily be taken care of by a table operated limit switch which made the reversing mechanism inoperative during the time the cutting tool was traversing the open space between the ends of the workpiece.

*Modification of Figure 8*

In the foregoing modifications the detection of the point at which the cutting member leaves the workpiece is made by measuring the power supply to the spindle drive motor. In Figure 8 I illustrate a modified arrangement where this detection is accomplished through the electrical contact between the cutting mmeber and the workpiece.

In Figure 8 the cutting member is indicated at 300 and the workpiece at 302, and an electric circuit is established between power lines L1 and L2 through the cutting member and work member and the solenoid of a contactor 304 arranged to control the energization of a timer 306 which corresponds to the timer T1 in Figure 4.

It will be apparent that in Figure 8 the arrangement is such that the timer 306 will be energized at either one or both ends of the cutting stroke that the cutting member takes on the workpiece. The Figure 8 arrangement would be particularly useful where the cutting member comprised a tool, such as is used in a planer or shaper, or in a milling machine, such tools comprising metallic members capable of conducting an electric current. In using a grinding wheel, as indicated in Figure 8, it would be necessary for either the grinding wheel to be conductive, or for there to be a conductor element associated with the grinding wheel and engaging the workpiece.

Figures 9, 10:
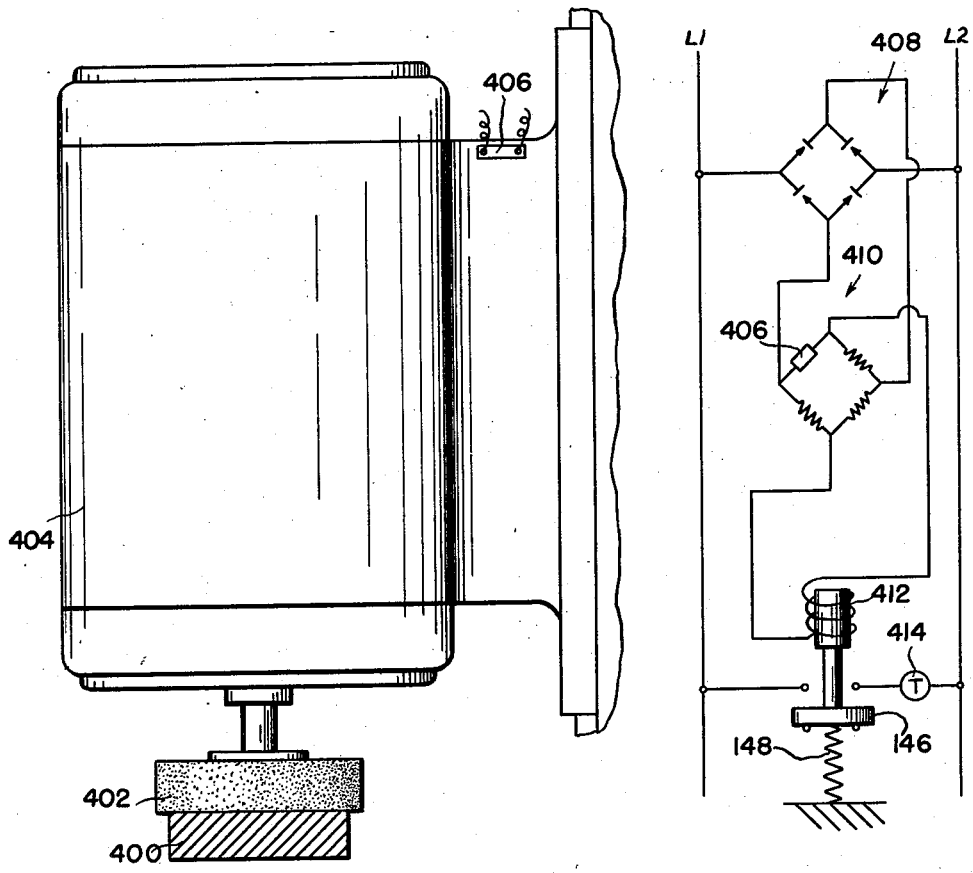
Figure 9 is a view showing still another modified arrangement for detecting the end of the cutting stroke of the machine.
Figure 10 is a diagrammatic showing of an electric circuit adapted for use with the modification of Figure 9.

*Modification of Figures 9 and 10*

In Figure 9 there is illustrated a still further modification for detecting the point at which the cutting member runs off the workpiece at the end of a cut. In this figure the workpiece is illustrated at 400 and the cutting member at 402, mounted in some suitable carrier, such as the wheel head 404.

Inasmuch as the wheel is under pressure when it is doing work, and is under no pressure when it is not doing work, a certain amount of strain is set up in the machine parts. For this reason, a strain gauge element, as indicated at 406, can be attached to the machine at some point, and its change in characteristics utilized for detecting when the cutting member leaves the workpiece. Such strain gauge elements are well-known, and generally comprise resistor units extremely sensitive to minute dimensional changes.

The resistor unit 406 may be connected in circuit, as shown in Figure 10, which illustrates a rectifier bridge 408 connected between power lines L1 and L2, and which supplies current to a resistor bridge 410 that includes as one leg the strain gauge element 406. A contactor coil 412 may be connected across opposite corners of the bridge, and this contactor controls timer 414, corresponding to timer T1 of Figure 4.

Figure 11:
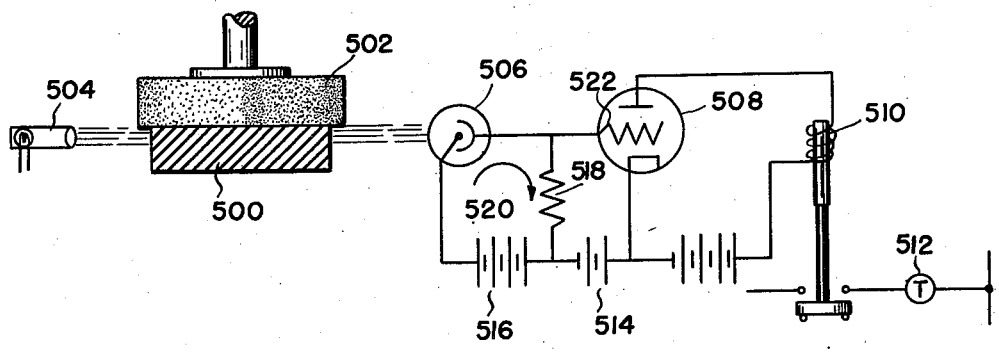
Figure 11 is a view showing a still further modification for detecting the end of the cutting stroke utilizing a light beam and photocell.

*Modification of Figure 11*

In Figure 11 the workpiece is indicated at 500 and the cutting member at 502. Arranged on one side of the cutting member is a light source 504, and on the other side is a photocell 506. When the cutting member is in engagement with the workpiece, the light beam to the cell is interrupted, and when the cutting member leaves the workpiece, the light beam to the cell is established.

The photocell is connected in circuit with an amplifier tube 508 whose plate circuit includes the solenoid of a contactor 510 that controls the timer 512, corresponding to timer T1 of Figure 4.

In the operation of the Figure 11 arrangement, when the cell 506 is dark, battery 514 biases tube 508 to cut off. When the photocell is illuminated, battery 516 causes a current to flow through resistor 518 in the direction indicated by arrow 520, and this changes the bias on the grid 522 of tube 508 to the point that the tube will conduct and will energize the solenoid of contactor 510, thereby making timer 512 effective in the manner previously described to reverse the table movement.

From the foregoing it will be seen that my invention provides a novel arrangement for operating a machine tool having relatively reciprocable or relatively oscillatable cutting and work members in a highly efficient manner.

All of the modifications illustrated are characterized in detecting the instant that the cutting tool and workpiece separate, and in bringing about a reversal of the relative movement therebetween, thus eliminating overtravel between the tool and workpiece.

It will be understood that this invention is susceptible to modification in order to adapt it to different usages and conditions, and, accordingly, it is desired to comprehend such modifications within this invention as may fall within the scope of the appended claims.

I claim:

1. In a machine tool: relatively movable tool supporting means and workpiece supporting means, reversible drive means for reversibly driving said supporting means relatively to carry out a work cycle, control means actuatable for causing reversal of said driving means, and means sensitive to the disengagement of a tool in said tool supporting means from a workpiece on said workpiece supporting means for actuating said control means.

2. In a machine tool: relatively movable tool supporting means and workpiece supporting means, reversible drive means for reversibly driving said supporting means relatively to carry out a work cycle, a control means actuatable for reversing said driving means, and means sensitive solely to the disengagement of a tool in said tool supporting means from a workpiece on said workpiece supporting means for actuating said control means, and means carried in part by said tool supporting means and in part by said workpiece supporting means for making said control means ineffective during at least a portion of the relative travel of said supporting means.

3. In a machine tool: relatively movable tool supporting means and workpiece supporting means, reversible drive means for reversibly driving said supporting means relatively to carry out a work cycle, a control means actuatable for reversing said driving means, means sensitive solely to the disengagement of a tool in said tool supporting means from a workpiece on said workpiece supporting means for actuating said control means thus causing reversal of said driving means regardless of the size and shape of the workpiece, said control means being effective in at least one direction of relative travel of said supporting means, and means carried in part by said tool supporting means and in part by said workpiece supporting means responsive to a predetermined amount of relative travel of the said supporting means in the said one direction to make said control means ineffective.

4. In a machine tool: relatively movable tool supporting means and workpiece supporting means, reversible drive means for reversibly driving said supporting means relatively to carry out a work cycle, control means actuatable for reversing said driving means, means sensitive solely to the disengagement of a tool in said tool supporting means from a workpiece on said workpiece supporting means for actuating said control means thus causing reversal of said driving means regardless of the size and shape of the workpiece, said control means comprising a first part for reversing said drive means when the support means are being driven in one relative direction and a second part for reversing said drive means when the support means are being driven in the other direction, and means for making said parts alternatively effective.

5. In a machine tool: relatively movable tool supporting and workpiece supporting members, reversible drive means for driving said members relatively, a control element for said drive means having a first position where the members are driven relatively in one direction and a second position where the members are driven relatively in the opposite direction, a shifting device energizable for shifting said element from its first to its second position, detecting and signal creating means for detecting the instant a tool in said tool supporting member disengages from a workpiece on said workpiece supporting member regardless of the configuration and size of the workpiece and for creating a signal, and means responsive solely to said signal when said members are moving relatively in said one direction for energizing said shifting device.

6. In a machine tool: relatively movable tool supporting and workpiece supporting members, reversible drive means for driving said members relatively, a control element for said drive means having a first position where the members are driven relatively in one direction and a second position where the members are driven relatively in the oposite direction, a shifting device energizable for shifting said element from its first to its second position, and means responsive to the reduction in load on a tool in said tool supporting member when said tool runs off a workpiece on said workpiece supporting member when said members are moving relatively in said one direction for energizing said shifting device.

7. In a machine tool: relatively movable tool supporting and workpiece supporting members, reversible drive means for driving said members relatively, a control element for said drive means having a first position where the members are driven relatively in one direction and a second position where the members are driven relatively in the opposite direction, a shifting device energizable for shifting said element from its first to its second position, and means responsive to the disengagement of a tool in said tool supporting member from a workpiece on said workpiece supporting member when said members are moving relatively in said one direction for energizing said shifting device, said means comprising an electric circuit for energizing said device, and said electric circuit including means responsive to the load on the said tool for controlling the energization of said circuit.

8. In a machine tool: relatively movable tool supporting and workpiece supporting members, reversible drive means for driving said members relatively, a control element for said drive means having a first position where the members are driven relatively in one direction and a second position where the members are driven relatively in the opposite direction, a shifting device energizable for shifting said element from its first to its second position, and means responsive to the disengagement of a tool in said tool supporting member from a workpiece on said workpiece supporting member when said members are moving relatively in said one direciton for energizing said shifting device, said means including a strain gauge element mounted on the machine in a position to be sensitive to loads on said tool and connected in circuit with said shifting device so reductions in load on the said tool will bring about energization of said device.

9. In a machine tool: relatively movable tool supporting and workpiece supporting members, reversible drive means for driving said members relatively, a control element for said drive means having a first position where the members are driven relatively in one direction and a second position where the members are driven relatively in the opposite direction, a shifting device energizable for shifting said element from its first to its second position, and means responsive to the disengagement of a tool in said tool supporting member from a workpiece on said workpiece supporting member when said members are moving relatively in said one direction for energizing said shifting device, said means comprising a circuit for energizing said device, a photocell controlling said circuit so as to permit energization of said device only when the cell is illuminated, and a light source associated with the cell, said light source and cell being on opposite sides of the work member and aligned with said tool so the light beam to the cell will be interrupted when the tool is engaging the work.

10. In a machine tool: a driven tool supporting member and a motor to drive the member, a reciprocable table and reversible driving means to drive the table, a reversing lever to control said driving means, and means responsive to changes in the power supply to said motor as brought about by disengagement of the tool and workpiece at the end of a cutting stroke for shifting said lever.

11. In a machine tool: a driven tool supporting member and a motor to drive the member, a reciprocable table and reversible driving means to drive the table, a reversing lever to control said driving means, a shifting device energizable to shift said lever, an energizing circuit for the device, and a contactor in said circuit sensitive to the power supply to said motor so the contactor will close only when the power supply is reduced to a predetermined value.

12. In a machine tool: a driven tool supporting member and a motor to drive the member, a reciprocable table and reversible driving means to drive the table, a reversing lever to control said driving means, a shifting device energizable to shift said lever, an energizing circuit for the device, a normally closed contactor in said circuit, and said contactor being in circuit with said motor so as to be open whenever the motor is under load.

13. In a machine tool: a driven tool supporting member and an electric motor to drive the member, a reciprocable table and reversible driving means to drive the table, a reversing lever to control said driving means, a shifting device energizable to shift said lever, an energizing circuit for the device, a normally closed contactor in said circuit, and a current transformer having its primary in circuit with said motor and its secondary connected to the solenoid of the contactor so the contactor will be open whenever the motor is loaded.

14. In a grinding machine: a wheel head including a spindle for supporting the grinding wheel and an electric motor for driving the spindle, a reciprocable table for supporting a workpiece and a reversible driving means for driving said table in reciprocation relative to said spindle, a control lever for controlling said driving means, a fluid operable shifting device energizable for shifting said lever, a valve for controlling the supply of fluid to said shifting device and normally positioned to make said shifting device ineffective, electrical means for moving said valve to make said shifting device effective, a contactor for controlling said electrical means, and a current transformer having its primary in circuit with the spindle motor and its secondary connected to the solenoid of the contactor so that when the spindle motor is loaded the contactor is held open, and when the spindle motor is unloaded the contactor will close.

15. In a grinding machine: a wheel head including a spindle for supporting the grinding wheel and an electric motor for driving the spindle, a reciprocable table for supporting a workpiece and a reversible driving means for driving said table in reciprocation relative to said spindle, a control lever for controlling said driving means, a fluid operable shifting device energizable for shifting said lever, a valve for controlling the supply of fluid to said shifting device and normally positioned to make said shifting device ineffective, electrical means for moving said valve to make said shifting device effective, a contactor for controlling said electrical means, a current transformer having its primary in circuit with the spindle motor and its secondary connected to the solenoid of the contactor so that when the spindle motor is loaded the contactor is held open, and when the spindle motor is unloaded the contactor will close, a normally closed switch in circuit with the contactor solenoid and the electrical means of said valve, and means on said table for actuating said switch when the table in at one end of its stroke, thereby to prevent operation of said shifting device in one direction of movement of the table.

16. In a grinding machine: a wheel head including a spindle for supporting a grinding wheel and a motor for driving the spindle, a table reciprocable relative to the spindle, reversible driving means for driving the table, a reversing lever for controlling the driving means, a shifting device arranged on each side of said reversing lever and each energizable for shifting said lever into a different one of its two operating positions, an energizing circuit for each said device, a normally closed contactor having an operating solenoid, a current transformer having its primary in circuit with said motor and its secondary connected to said solenoid so that when the motor is loaded by the engagement of the grinding wheel with a workpiece, the contactor will be open, and, when the motor is unloaded by the disengagement of the grinding wheel from a workpiece, the contactor will close, said contactor being arranged to energize the energizing circuits for said devices, and means in said circuits for making one of the circuits effective when the table is moving in one direction and the other circuit effective when the table is moving in the other direction.

17. The method of operating a machine tool having relatively reciprocable workpiece supporting and tool supporting means for the operating of workpieces having a surface to be machined that changes in length in the direction of said reciprocation as the operating of the workpieces proceeds comprising: reciprocating the supporting means relatively, measuring the load on the tool due to its engagement with the workpiece, continuing the relative movement between the supporting means in the same direction while the measured load is above a predetermined amount, and reversing the direction of said relative movement when said measured load falls below said predetermined amount.

18. The method of operating a machine tool to machine a workpiece on which a variable length cut is to be taken as the machining of the workpiece progresses which comprises: driving the tool, driving the tool and workpiece relatively in one direction, measuring the load on the tool due to its cutting action on the workpiece, and reversing the direction of relative driving of the tool and workpiece when the measured load on the tool falls below a predetermined amount.

19. In a machine tool: a reciprocable table, a fluid motor for driving said table, a source of fluid pressure for supplying said motor, a reversing valve connected between said source of fluid pressure and said motor for controlling the direction of movement of said table, a reversing lever for said valve, dogs on said table for engaging and shifting said lever at the opposite limits of travel of said table, fluid operable means operatively associated with said lever normally de-energized so the lever can be freely shifted by said dogs, and means for supplying fluid under pressure to said fluid operable means for energizing the same for shifting said lever independently of the position of said table and said dogs.

HERBERT F. SMITH.

REFERENCES CITED

The following references are of record in the file of this patent:

UNITED STATES PATENTS

| Number | Name | Date |
| --- | --- | --- |
| 1,717,326 | Shaw et al. | June 11, 1929 |
| 1,872,552 | Arms | Aug. 16, 1932 |
| 1,977,341 | Mackintosh | Oct. 16, 1934 |
| 1,996,465 | Ernst | Apr. 2, 1935 |
| 2,129,049 | Doran | Sept. 6, 1938 |
| 2,161,216 | Wood | June 6, 1939 |

FOREIGN PATENTS

| Number | Country | Date |
| --- | --- | --- |
| 1,888 | Great Britain | Apr. 13, 1883 |
| 509,552 | Great Britain | July 18, 1939 |